United States Patent [19]
Kirtley

[11] Patent Number: 4,787,340
[45] Date of Patent: Nov. 29, 1988

[54] ANIMAL COLLAR AND LEASH SET

[76] Inventor: Douglas A. Kirtley, 6515 SW. 21st St., Miramar, Fla. 33023

[21] Appl. No.: 18,170

[22] Filed: Feb. 24, 1987

[51] Int. Cl.⁴ .............................................. A01K 27/00
[52] U.S. Cl. ...................................... 119/106; 119/109
[58] Field of Search ......................... 119/96, 106, 109; 128/DIG. 15, 133, 134, 165

[56] References Cited

U.S. PATENT DOCUMENTS

| 3,297,026 | 1/1967 | Van Pelt | 128/165 |
| 3,332,398 | 7/1967 | Mintz | 119/109 |
| 4,091,766 | 5/1978 | Colliard | 119/106 |
| 4,459,980 | 7/1984 | Perser et al. | 128/DIG. 15 X |
| 4,584,967 | 4/1986 | Taplin | 119/106 |

FOREIGN PATENT DOCUMENTS

| 2334289 | 10/1975 | France | 119/106 |
| 8501857 | 5/1985 | PCT Int'l Appl. | 119/106 |

Primary Examiner—Gene Mancene
Assistant Examiner—R. Thomas Price
Attorney, Agent, or Firm—Richard L. Miller

[57] ABSTRACT

An animal collar and leash for use in securing an animal which can easily be adjusted to meet animal size. The animal collar and leash are easily attached to an animal and easily removed.

1 Claim, 1 Drawing Sheet

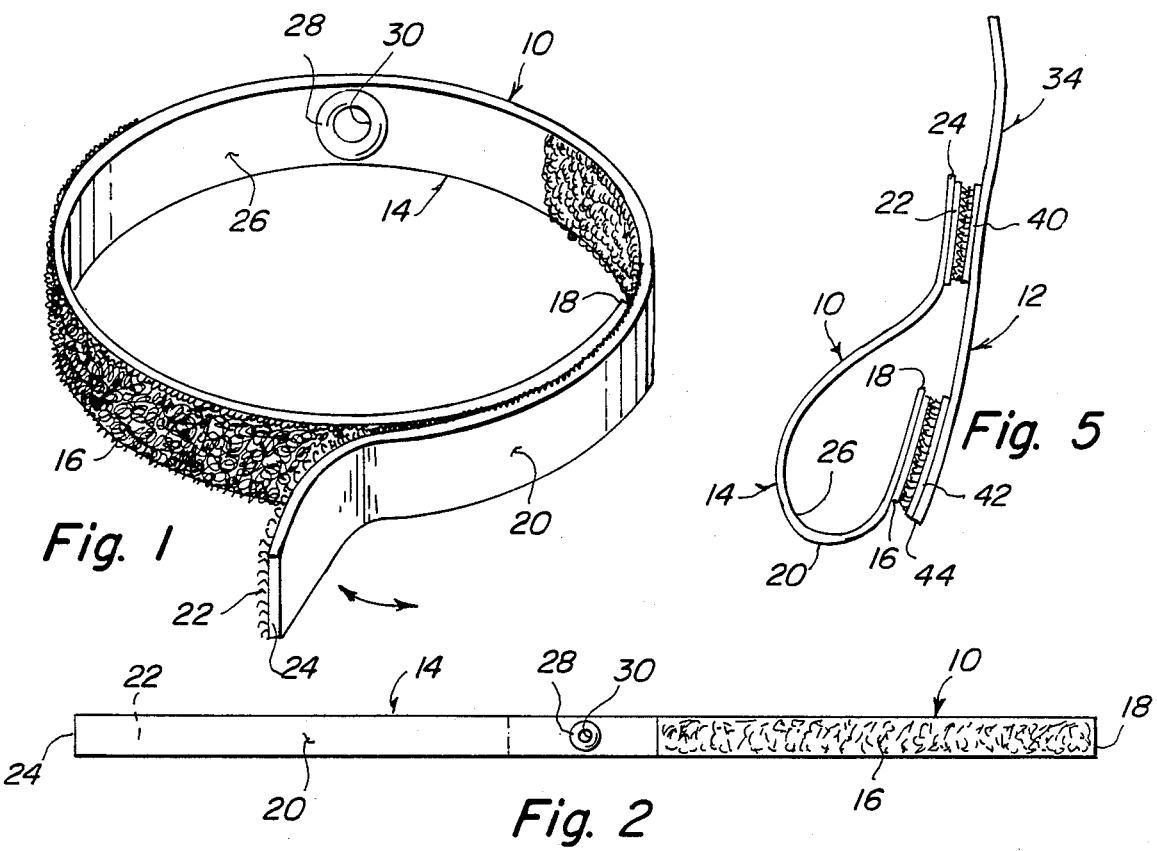
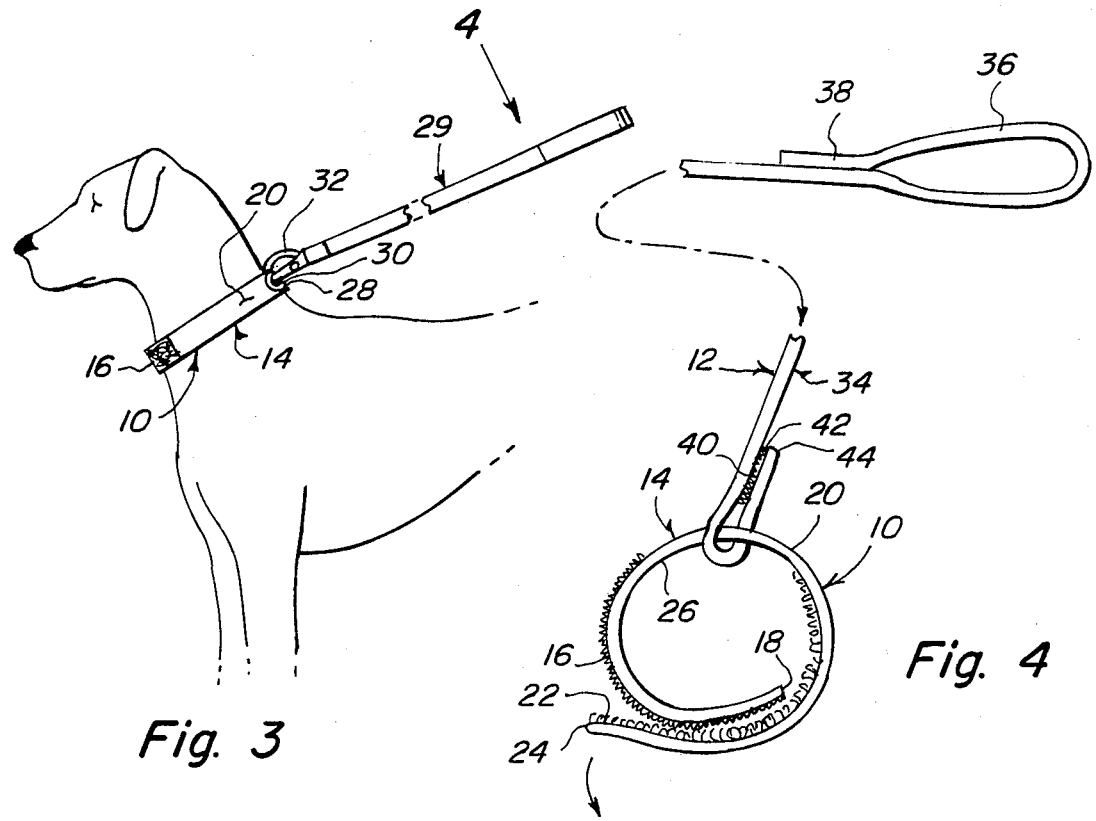

4,787,340

ANIMAL COLLAR AND LEASH SET

BACKGROUND OF THE INVENTION

The instant invention relates generally to animal supplies and more particularly to animal collars and leashes are adjustable to animal size.

Numerous animal collars and leashes have been provided in the prior art that are adapted to suit various animal needs. For example, U.S. Pat. Nos. 4,047,505; 4,091,766 and 4,413,588 all are illustrative of such prior art. While these units may be suitable for the particular purpose to which they address, they would not be as suitable for the purpose of the present invention as hereafter described.

SUMMARY OF THE INVENTION

A primary object of the present invention is to provide an animal collar and leash that will overcome the shortcomings of the prior art devices.

Another object is to provide an animal collar and leash that is adjustable for animal size.

An additional object is to provide an animal collar and leash that can be made smaller or larger depending on age of animal.

A further object is to provide an animal collar and leash that is simple and easy to use.

A yet further object is to provide an animal collar which can be quickly removed from the animal.

A still further object is to provide an animal collar and leash that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claim.

BRIEF DESCRIPTION OF THE DRAWING FIGURES

The figures in the drawings are briefly described as follows:

FIG. 1 is a perspective view of the dog collar portion of the invention per se.

FIG. 2 is a reduced perspective view of thereof spread out flat.

FIG. 3 is a fragmentary view of the collar connected to a conventional leash and positioned around the neck of a dog.

FIG. 4 is a fragmentary view of the dog collar and leash as seen in the direction of arrow 4 in FIG. 3 showing a FIG. 5 is a fragmentary view of the dog collar and leash as seen in the direction of arrow 4 in FIG. 3 showing a second way of also connecting together the collar and leash.

DETAILED DESCRIPTION OF THE PREFERRED EMBODIMENTS

Turning now descriptively to the drawings, in which like reference characters denote like elements throughout the several views, FIG. 1 through 5 illustrate an animal collar 10 and leash 12, wherein animal collar 10 is made up of a strip of durable material 14 having mating loop pile 16 on one end 18 on one side 20 of two sides and hooks pile 22 on opposite end 24 of the second end on other side 26 of the two sides. As can be seen in FIG. 1 loop pile 16 mates with hooks pile 22 when the ends 20 and 24 of the animal collar 10 are placed one over the other, securing the collar in a desired circumference.

Animal collar 10 has grommet 2 center through which a conventional leash 29 using clip 32 placed through the grommet's opening seen in FIG. 3.

Animal leash 12 is made up of durable material 34 having a looped handle 36 on one end 38 of two ends; and mating loop pile 40 and hook pile 42 sewn one directly beneath the opposite end 44.

In operative use a first way the animal leash 12 can be secured around animal collar 10 is by looping the opposite end 44 around the collar and connecting mating loop pile 40 and hook pile 42 together as best seen in FIG. 4.

Or a second way the animal leash 12 can be connected to animal collar 10 is by fastening mating loop pile 16 of the collar 10 with hook pile 42 of the leash 12 and connecting hook pile 22 of the animal collar 10 with mating loop pile 40 of the animal collar 10 together as can be best seen in FIG. 5.

The second way permits and animal of larger neck size to wear the the collar and leash set, and also permits the more rapid removal of the collar.

While certain novel features of this invention have been shown and described and are pointed out in the annexed claim, it will be understood that various omissions, substitutions and changes in the forms and details of the device illustrated and in its operation can be made by those skilled in the art without departing from the spirit of the invention.

What is claimed is:

1. An animal collar and leash set which comprises:
   (a) a collar with means for attaching said collar to any leash;
   (b) a leash with means for attaching said leash to any collar;
   (c) singular means having a first configuration providing a permanent attachment of said collar to said leash and having a second configuration providing a quick release attachment of said collar to said leash, wherein said leash further comprises:
   (d) a first conventional handle end to be held in the hand of a person;
   (e) a second attachment end for attaching to any collar, said attachment end having mating hook pile and loop pile fastener material which can be secured together in a loop through any collar thereby forming said first configuration for attachment of said collar to said leash, and wherein said collar further comprises;
   (i) a first end having loop pile fastener material;
   (ii) a second end having hook pile fastener which mates with the first end, wherein;
   (iii) said first end of said collar can be secured to said mating hook pile of said leash; and
   (iv) said second end of said collar can be secured to said mating loop pile of said leash, thereby forming said second configuration for providing a quick release attachment of said collar to said leash.

* * * * *